(12) United States Patent
Nolte et al.

(10) Patent No.: US 7,018,679 B2
(45) Date of Patent: Mar. 28, 2006

(54) COATING INSTALLATION WITH AN ATOMIZER CHANGE STATION

(75) Inventors: Hans J. Nolte, Stuttgart (DE); Harry Krumma, Bönnigheim (DE); Frank Herre, Oberriexingen (DE); Michael Baumann, Flein (DE); Stefano Giuliano, Gerlingen (DE); Rainer Melcher, Oberstenfeldt (DE); Juergen Haas, Knittlingen (DE)

(73) Assignee: Dürr Systems, Inc., Plymouth, MI (US)

( * ) Notice: Subject to any disclaimer, the term of this patent is extended or adjusted under 35 U.S.C. 154(b) by 503 days.

(21) Appl. No.: 10/360,774

(22) Filed: Mar. 27, 2002

(65) Prior Publication Data

US 2004/0129208 A1  Jul. 8, 2004

(30) Foreign Application Priority Data

Mar. 29, 2001 (DE) .............................. 101 15 470

(51) Int. Cl.
*B05D 7/00* (2006.01)
*C23C 18/00* (2006.01)
*B23Q 3/155* (2006.01)

(52) U.S. Cl. .......................................... 427/421; 438/1
(58) Field of Classification Search ................ 427/421; 118/302, 323; 239/305; 483/1, 901, 66, 483/67
See application file for complete search history.

(56) References Cited

U.S. PATENT DOCUMENTS

| | | | |
|---|---|---|---|
| 4,376,135 A | 3/1983 | Patel et al. | 427/31 |
| 4,521,462 A | 6/1985 | Smythe | 427/421 |
| 4,572,437 A | 2/1986 | Huber et al. | 239/703 |
| 4,589,597 A | 5/1986 | Robisch et al. | 239/703 |
| 4,684,064 A | 8/1987 | Kwok | 239/223 |
| 4,715,314 A | 12/1987 | Ramseier et al. | 118/631 |
| 4,852,810 A | 8/1989 | Behr et al. | 239/703 |
| 4,919,333 A | 4/1990 | Weinstein | 239/223 |
| 4,927,081 A | 5/1990 | Kwok et al. | 239/223 |
| 4,944,459 A * | 7/1990 | Watanabe et al. | 239/305 |
| 4,955,960 A | 9/1990 | Behr et al. | 239/3 |
| 5,011,086 A | 4/1991 | Sonnleitner et al. | 239/691 |
| 5,078,321 A | 1/1992 | Davis et al. | 239/224 |
| 5,127,125 A | 7/1992 | Skibowski | 15/104.061 |
| 5,294,217 A | 3/1994 | Talacko et al. | 406/91 |
| 5,300,006 A | 4/1994 | Tanaka et al. | 483/56 |
| 5,397,063 A | 3/1995 | Weinstein | 239/703 |
| 5,622,563 A | 4/1997 | Howe et al. | 118/620 |
| 5,633,306 A | 5/1997 | Howe et al. | 524/409 |
| 5,662,278 A | 9/1997 | Howe et al. | 239/700 |
| 5,683,032 A | 11/1997 | Braslaw et al. | 239/7 |
| 5,704,977 A | 1/1998 | Baumann et al. | 118/323 |
| 5,865,380 A | 2/1999 | Kazama et al. | 239/704 |
| 6,037,010 A | 3/2000 | Kahmann et al. | 427/421 |
| 6,090,450 A | 7/2000 | Kahmann et al. | 427/421 |

(Continued)

FOREIGN PATENT DOCUMENTS

DE   41 05 116 A 1   8/1992

(Continued)

*Primary Examiner*—Timothy Meeks
*Assistant Examiner*—Eric B. Fuller
(74) *Attorney, Agent, or Firm*—Howard & Howard

(57) ABSTRACT

A change station for atomizer (7) and other tools that contains a carousel-like rotatable and/or linearly movable mount (112) is arranged on the wall of the cabin of a coating installation. The arrangement is such that the storage locations of the change station are accessible both to the coating machine (151) in the cabin and from outside the cabin.

11 Claims, 7 Drawing Sheets

U.S. PATENT DOCUMENTS

| | | |
|---|---|---|
| 6,508,610 B1 | 1/2003 | Dietrich ................... 406/13 |
| 6,589,348 B1 | 7/2003 | Ott ........................ 118/684 |

FOREIGN PATENT DOCUMENTS

| | | |
|---|---|---|
| DE | 43 42 128 A1 | 6/1995 |
| DE | 196 10 588 A 1 | 9/1997 |
| DE | 197 09 988 A 1 | 10/1998 |
| DE | 197 42 588 A1 | 4/1999 |
| DE | 198 30 029 A 1 | 1/2000 |
| DE | 199 09 369 A 1 | 9/2000 |
| DE | 199 37 425 A 1 | 3/2001 |
| DE | 100 33 986 A 1 | 1/2002 |
| DE | 100 63 234 C 1 | 7/2002 |
| DE | 101 30 178 A 1 | 1/2003 |
| EP | 0 767 005 A1 | 4/1997 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 1 172 152 A1 | 1/2002 |
| WO | WO 94/22589 | 10/1994 |

\* cited by examiner

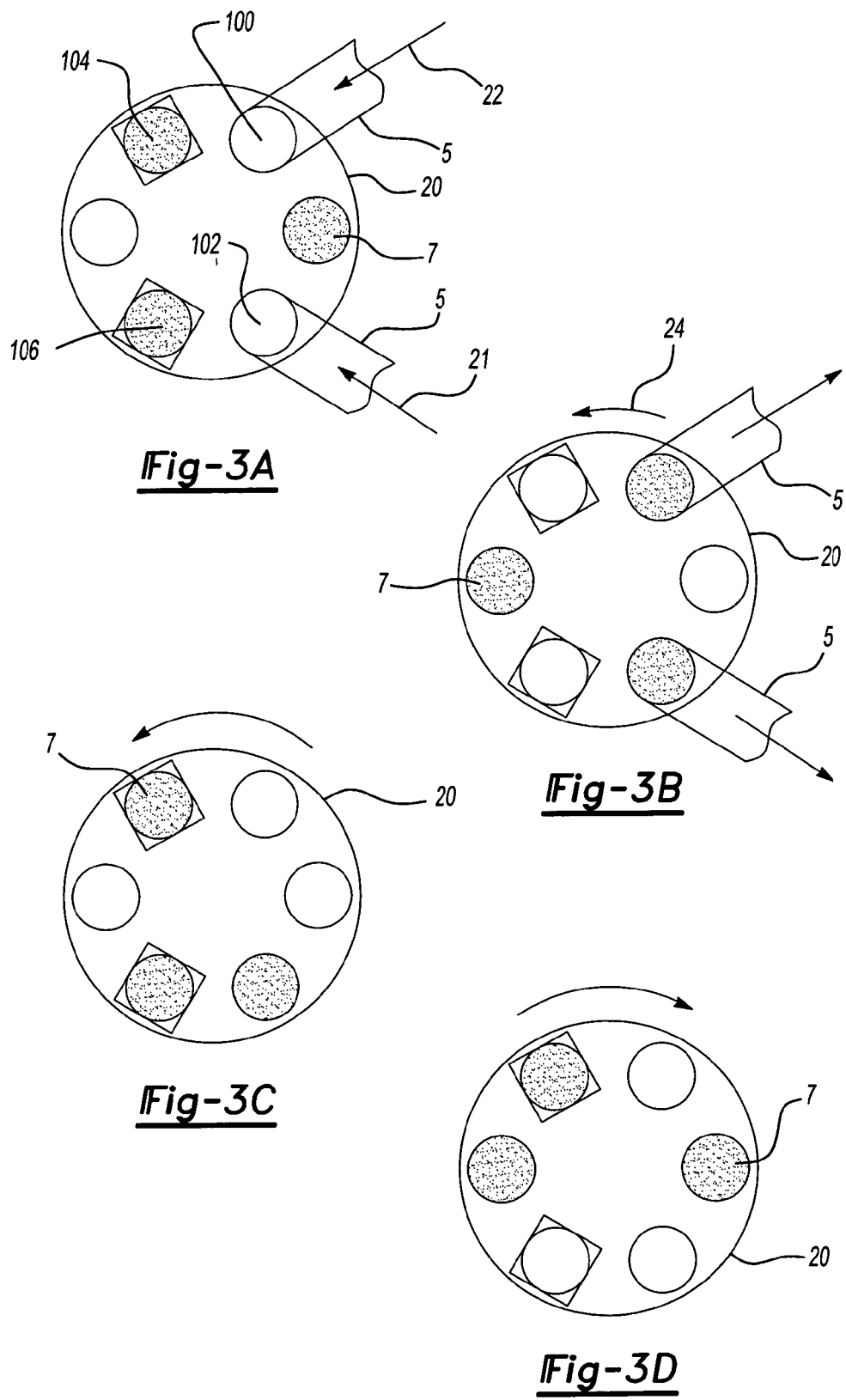

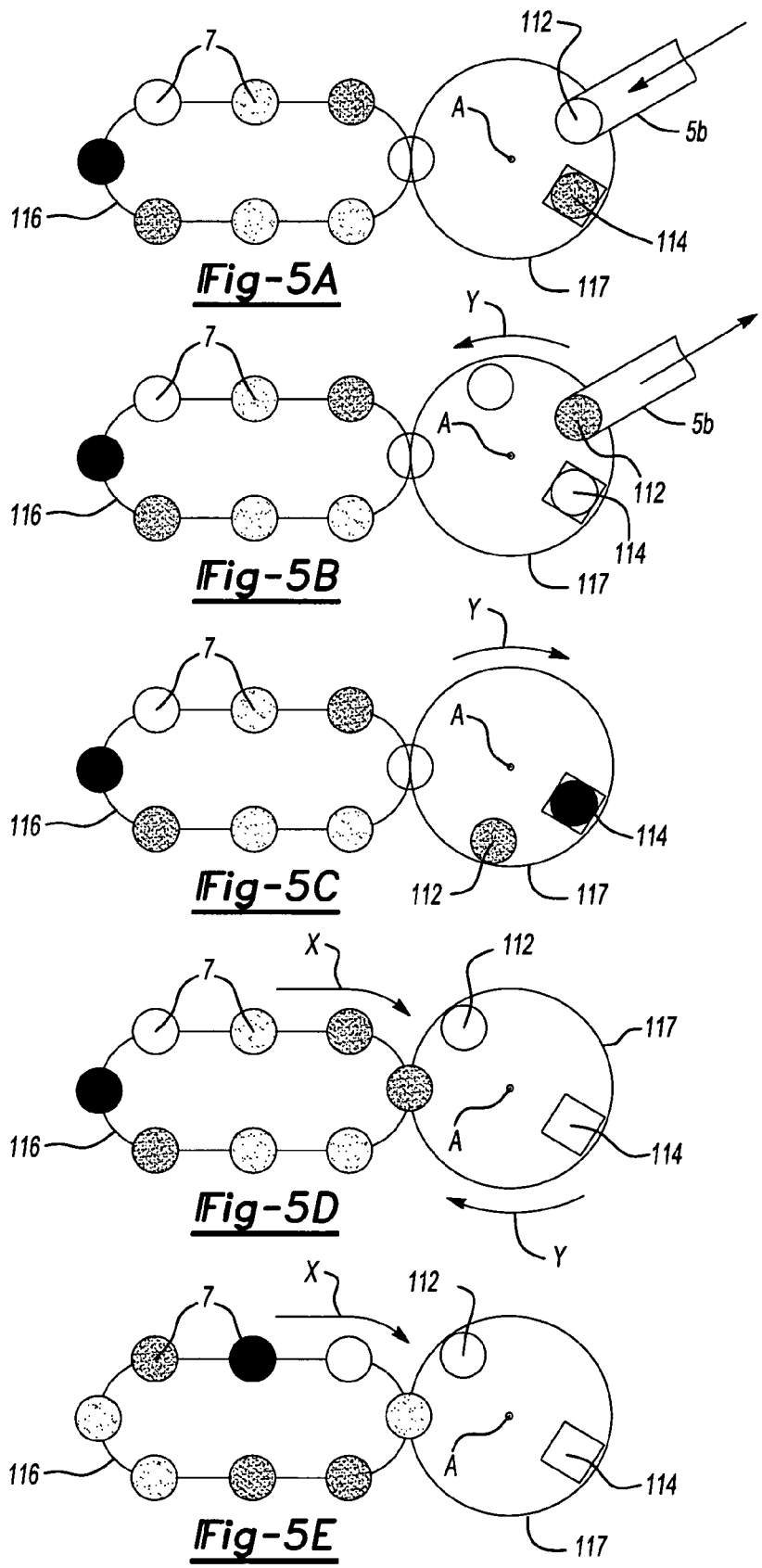

COATING INSTALLATION WITH AN ATOMIZER CHANGE STATION

FIELD OF THE INVENTION

The invention concerns a coating installation and a method according to the preamble of the independent claims. In particular, it involves an installation for the coating of workpieces, such as vehicle bodies, with one or more painting robots with replaceable atomizers in a spray cabin.

BACKGROUND OF THE INVENTION

It is known to arrange atomizers, replaceably installed on painting robots, in a row in the interior of the painting cabin, where they can be retrieved by the robots, as required. This process is relatively time-consuming. The same applies to the necessary supply and cleaning of the atomizer in the change station. In addition, the change arrangements known thus far have undesirably high space requirements.

The replaceable atomizers can expediently contain supply vessels filled with coating materials of different color.

The objective of the invention is to permit rapid replacement of the atomizers with another atomizer or, as required, with a tool, such as a measurement device or gripping tool, etc., with a change system that occupies as little space as possible.

This objective is realized by the features of the patent claims.

With the carousel arrangement described here, a very compact, space-saving, as well as rapid and simply accessible change station, especially during rotation, is devised, which is available not only for the atomizers being changed, but also for other devices or tools required by a robot during the coating operation. The rotational movement can be a complete (carousel-like) rotation or simple pivoting.

It is also advantageous that the atomizers can be connected more simply than before in these change stations to supply lines for coating material and to common line systems for cleaning media, compressed air, etc.

An identification system provided in the change station for the atomizers in the carousel also permits the atomizer data pertaining to maintenance to be simply read out. The required atomizer data include information, such as hours of operation; list of the painting zones, painting line, type of paint, etc., in which the atomizer was used; list of amount of paint (liter output and standby operation); performed maintenance work; performed cleaning work. Maintenance instructions can be recovered, for example, from the atomizer data.

The automatic removable mount that serves as a carousel can also advantageously be movable within the cabin, especially linearly parallel to the direction of conveyance of the workpieces being coated and therefore parallel to the $7^{th}$ axis of the robot corresponding to it, so that the required atomizer can be brought to the robot for time saving.

A particularly important possibility consists of the fact that the device containing the storage locations, i.e., the carousel, is arranged on the cabin wall, or preferably as a part of this wall, so that it is rapidly accessible, on the one hand, from the interior of the cabin and, on the other hand, from the outside. The atomizers or tools can be retrieved from the inside and used by a robot, whereas manual replacement is possible from the outside.

The carousel-like storage device can be arranged with particular advantage so that the common center of the storage locations, i.e., the carousel axis, lies in the plane of the cabin wall, and the cabin wall plane therefore passes through the center of the storage device.

To cover the storage device, there is also the possibility of arranging the outward lying part of the device in an attachment, for example, with a door that is only opened as required to change an atomizer or other tool. The part accessible to the robot in the cabin interior can also be provided with a closed covering with an access for the robot, which is opened as required. In addition, or alternatively, the storage device can be protected by an air stream that serves as an air curtain.

In particular, when the center of rotation of the storage device is situated in or near the plane of the cabin wall, a shell structure, rotatable about the center of the storage device, can be incorporated in the cabin wall expediently as a cover instead of fixed structures, for example, a cylindrical half-shell. The interior of this shell structure, opened only to one side, is accessible from the exterior or from the cabin interior, depending on its rotational position, the cabin being sealed outwardly in both cases.

The change station described here is also advantageously expandable in simple fashion and not only by enlarging the carousel, but also by connecting additional magazines.

Different embodiment examples of a coating installation according to the invention are further explained with reference to the drawing. In the drawing:

BRIEF DESCRIPTION OF THE DRAWINGS

FIGS. 3a to d show an atomizer exchange for two robots with a carousel;

FIGS. 5a to e show an atomizer chain with the pivot unit from FIG. 3 and a magazine;

DETAILED DESCRIPTION OF THE DRAWINGS

Figure 1A:
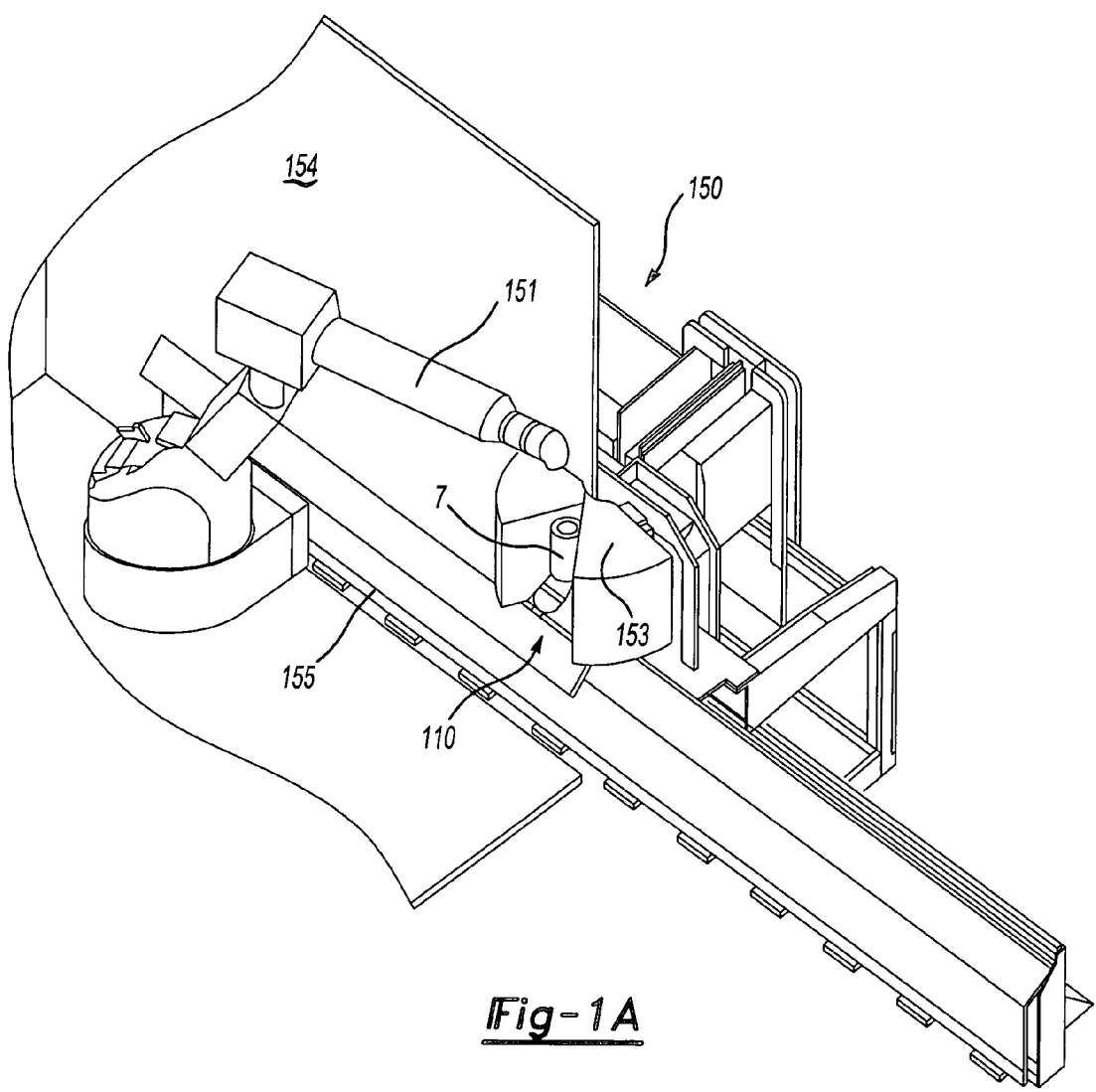
FIGS. 1A and 1B show perspective views of an atomizer change station in a coating installation.

FIG. 1A shows a coating installation with an atomizer change station and a coating robot 151. The coating robot 151 can remove atomizer 7 filled with coating material for the coating of workpieces from a carousel 112 (FIG. 2) situated in the change station at a removal station 110. The change station 150 is provided with a cover 153 to be opened and closed by a robot, with which the carousel 110 is protected from undesired soiling. The robot is movable within a cabin provided with cabin walls 154 on a linear guide 155 and can therefore reach the workpieces being coated (not described further) from the change station 150.

Figure 1B:
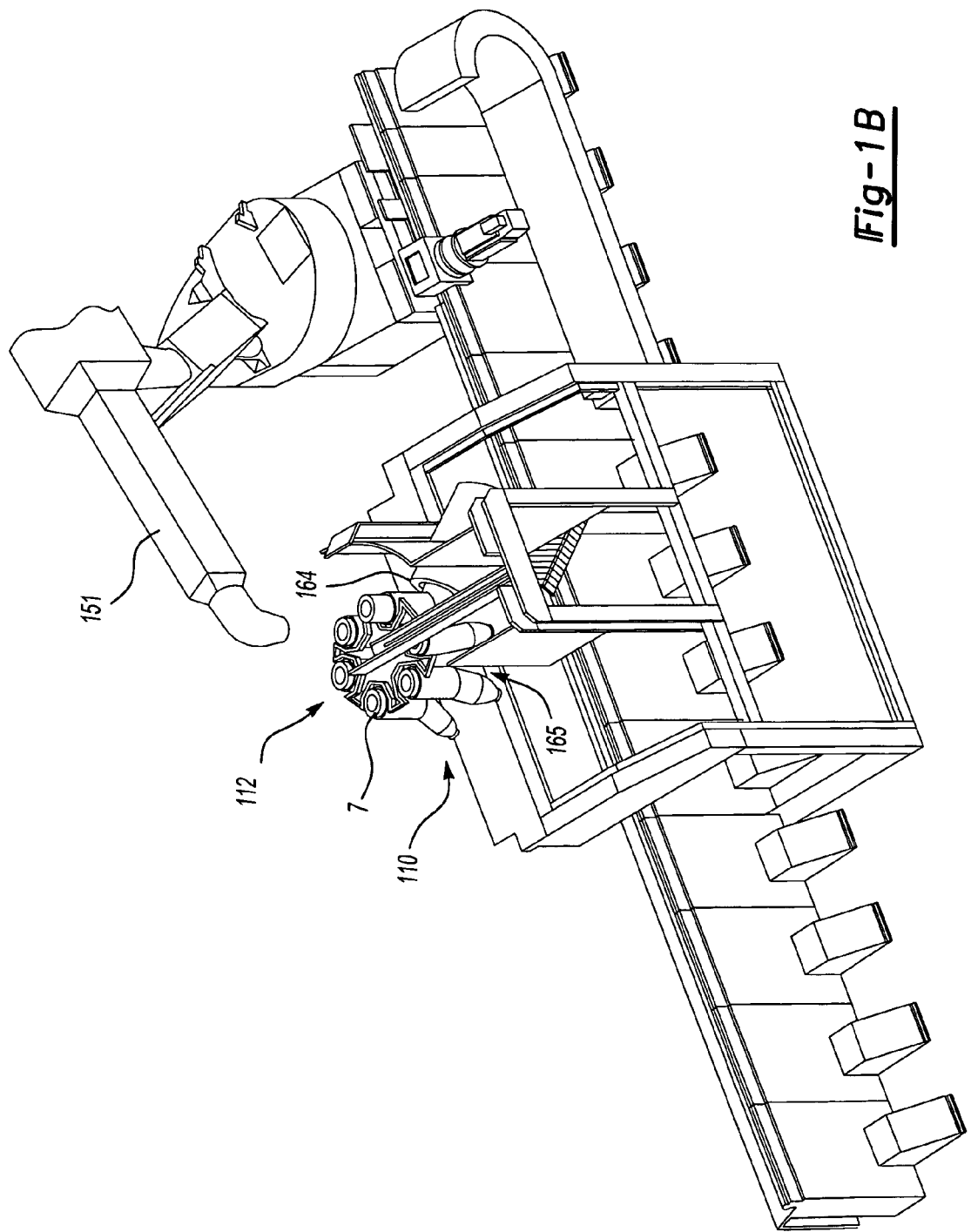

FIG. 1B shows the change station in another view without the cover and cabin walls. The robot 151 can remove the atomizer 7 provided with paint vessels for the coating of the workpiece from the carousel 110. After the robot has returned an atomizer 7 with the empty paint vessels back to carousel 110, the paint vessel and atomizer can be cleaned in a cleaning station 164, in order to then be refilled with coating material in a filling station (not shown here). The change station 150 also has a manual insertion station 165 for manual insertion or removal of atomizers.

Figure 2A:
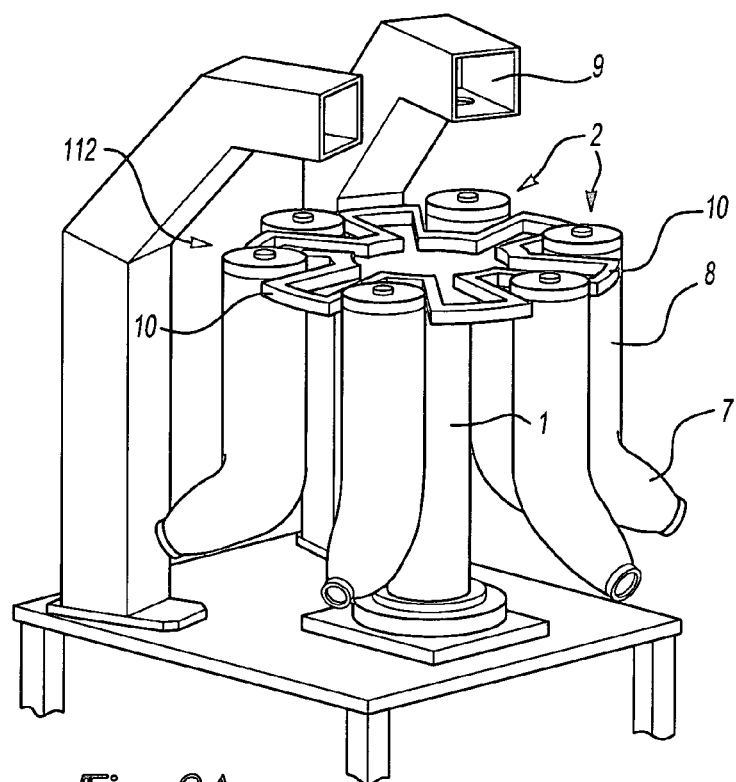
FIGS. 2A and 2B show perspective views of a rotatable atomizer carousel of the change station.
Figure 2B:
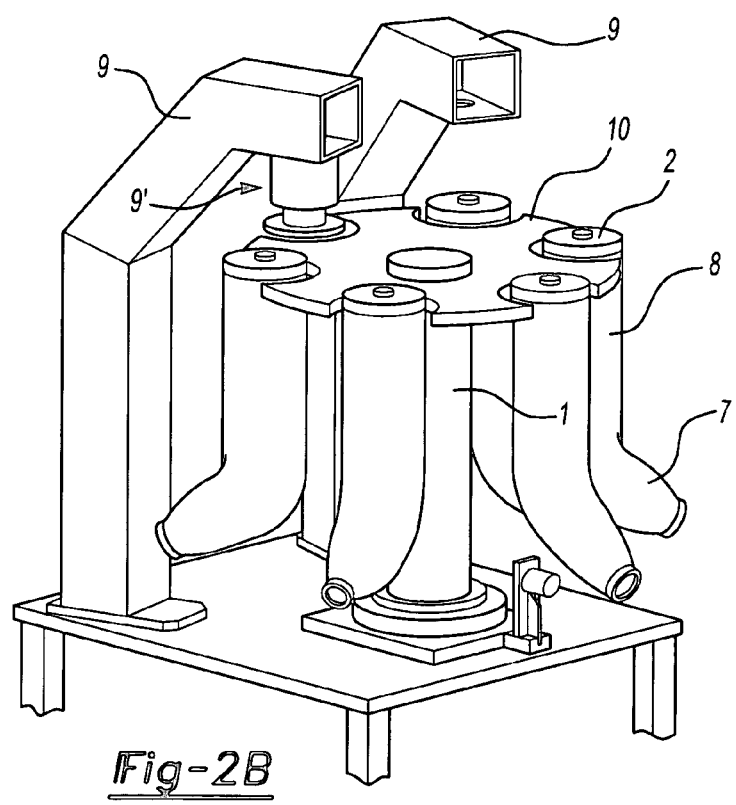

FIG. 2A shows another view of the change station 100 with the rotatable atomizer carousel 112. In the embodiment shown, the atomizer carousel 112 has six storage locations 2 in which the atomizers 7 can be stored. The storage locations 2 are integrated in a mounting plate 10. The size and the number of storage locations 2 vary as a function of the number of atomizers 7 to be accommodated in the mounting plate 10. Depending upon the given embodiment, the carousel can therefore have different sizes. Regardless of the size of the change station described here, the storage locations 2 and therefore the atomizers 7, are arranged in circular fashion about a common center 1, about which the mounting plate 10 rotates. The carousel 12, and optionally the change station 100, can be moved linearly within the cabin (FIG. 1A) so that time is saved by the robot (not described further) with respect to the atomizers 7 (FIGS. 1A and 1B). The change station also has a rinsing and filling station 9, at which the paint vessels 8 of the atomizers 7 can be rinsed and filled with new paint (see FIG. 2B, arrow 9'). The change station can be arranged in the region of the cabin wall (not shown here) (FIG. 1A), so that both the robot within the cabin and the operating personnel outside the cabin can engage the atomizers 7 arranged in the storage locations 2. Covers, mechanically controlled doors, or an air curtain (not shown) can also prevent contamination of the atomizers 7 stored in the carousel 1. The circular arrangement of the atomizers 7 in the storage locations 2 facilitates simultaneous engagement by two robots of the atomizers 7 stored in the carousel 1.

FIGS. 3a to 3d show the process of replacement of atomizers 7 by two robots 5, where a rotatable turntable 20 represents the carousel. In FIG. 3a, the robot 5 supplies atomizer 7' with paint vessels just consumed during coating to the turntable 20 in the direction of arrows 21 and 22. To accommodate the empty atomizer 7', two stationary storage and removal or transfer stations 23 located on the carousel are available. Atomizers 7 with filled paint vessels are located in the rinsing and filling station 9.

In FIG. 3b, the turntable 20 is further rotated in the direction of arrow 24 by one storage location, so that the filled atomizers 7 reach the transfer station 23, in order to be taken up by the robot there, according to the direction of arrows 25 and 26. By rotation of turntable 20 in the direction of arrow 24 by one storage location, the empty atomizers 7' again reach the rinsing and filling stations 9.

In FIG. 3c, the turntable 20 is further rotated in the direction of arrow 27 by two storage locations, so that the two empty atomizers 7' shown in FIG. 3b are conveyed further to the rinsing and filling stations 9, in order to be rinsed and filled there. The storage locations made available by removal of the two atomizers 7 from FIG. 3b are now in the position shown in FIG. 3c.

According to FIG. 3d, the turntable 20 is rotated back by two storage locations in the direction of arrow 28, so that the storage locations 2 not occupied by an atomizer 7 are brought into the position at the atomizer, storage and removal stations (transfer stations 23 in FIG. 3a) in which they can accommodate the empty atomizers delivered by robot 5.

Figure 4A:
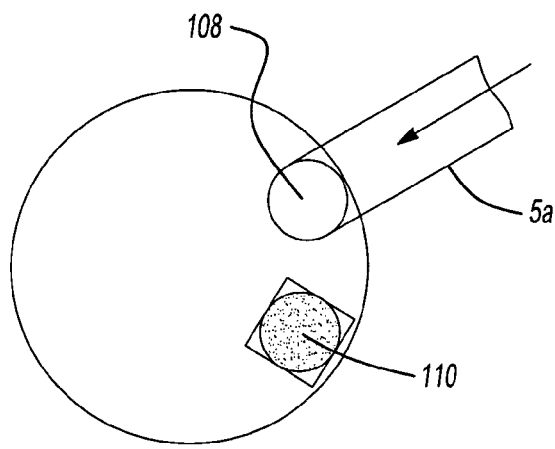
FIGS. 4a to d show an atomizer exchange for a robot with a carousel.

FIG. 4a shows the process of a change of atomizers with only one robot. A pivot unit 30 with two storage locations 2 is arranged at a stationary transfer station 23 and a stationary rinsing and filling station 9. The robot 5 places an empty atomizer 7' on the pivot unit 30, coming from the direction of arrow 31, as shown in FIG. 4a.

Figure 4B:
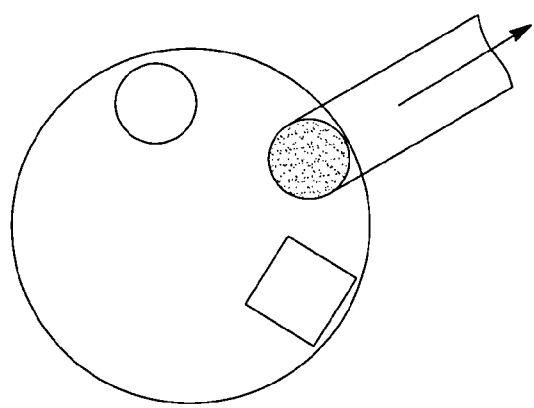

According to FIG. 4b, the pivot unit 30 is rotated in the direction of arrow 32 and an atomizer 7, filled beforehand (FIG. 4a), is taken up by robot 5 and transported away in the direction of arrow 33.

Figure 4C:
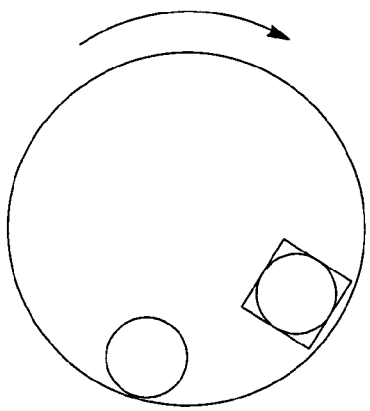

In FIG. 4c, the pivot unit 30 has been rotated by two storage locations in the direction of arrow 34 opposite that of arrow 32, so that the empty atomizer 7', positioned by robot 5 in FIG. 4a, can be rinsed and filled in the rinsing and filling station 9.

Figure 4D:
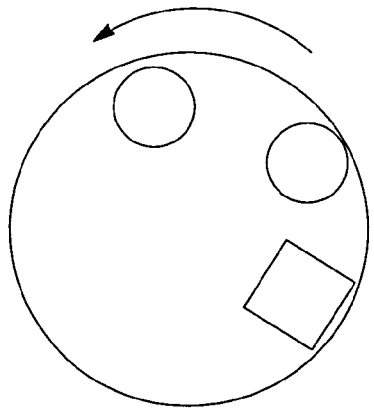

According to FIG. 4d, the pivot unit 30 is rotated by two storage locations in the direction of arrow 35, corresponding to arrow 32, so that the storage location 2, made available by the removal of the full atomizer 7 in FIG. 4b, is situated at the transfer station 23 to accommodate an emptied atomizer 7.

FIG. 5 shows a pivot unit 30 according to FIG. 4, to which a rotatable magazine 40 is connected (for 4 to 10 storage locations). The robot 5 brings an empty atomizer 7', coming from the direction of arrow 41 in FIG. 5a, to transfer station 23. A filled atomizer 7 is situated in the rinsing and filling station 9. An empty magazine place 42 is present at the connection site between the pivot unit 30 and magazine 40.

In FIG. 5b, the pivot unit 30 was rotated in the direction of arrow 43, so that the atomizer 7, filled in FIG. 5a, is ready to be taken up by robot 5, in order to be transported by robot 5 in the direction of arrow 44.

According to FIG. 5c, the pivot unit 30 is rotated by two storage locations in the opposite direction of arrow 45, and, in FIG. 5a, the removed empty atomizer 7' is rinsed and filled in the rinsing and filling station 9. The pivot unit 30 is then further rotated by three storage locations in the direction of arrow 46 (FIG. 5d) and the atomizer 7, filled in FIG. 5c, is brought to the position of the empty magazine place 42. Thereupon, the magazine 40 is rotated in the direction of arrow 47 (FIG. 5e) and another filled atomizer 7 is supplied to pivot unit 30. In the next step (not shown here), the pivot unit 30 is rotated until the empty storage location 2, not occupied by a paint vessel, reaches the transfer position 23 (FIG. 5a), so that an empty atomizer can be taken up by robot S.

Figure 6:
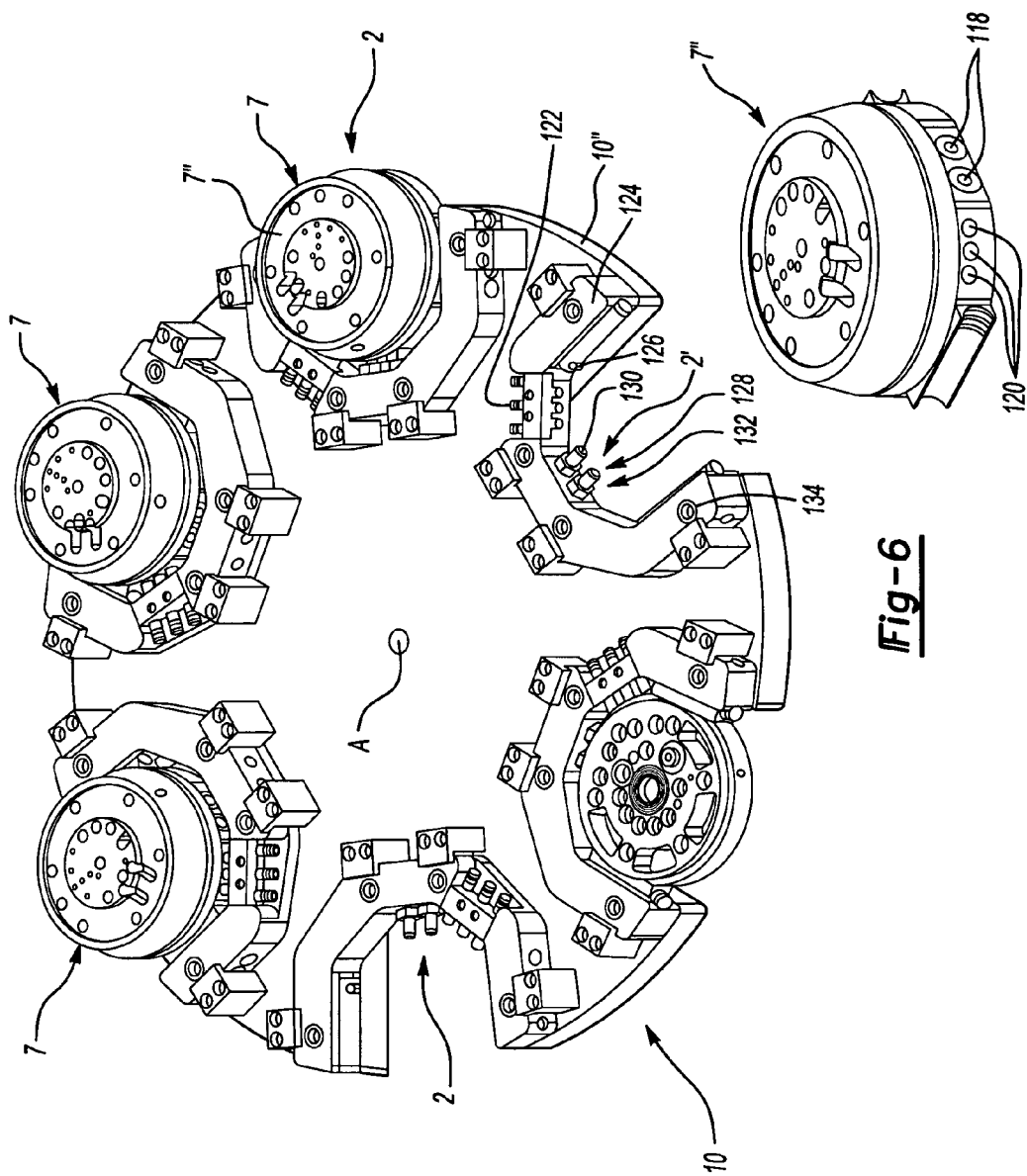
FIG. 6 shows a mounting plate of the carousel.

FIG. 6 shows an embodiment of the mounting plate 10 of the change station 100 depicted in FIG. 2. The mounting plate 10 has six fork-like recesses forming the storage locations 2, into which the atomizers can be introduced in the direction of arrow 2', with their flange parts 7" separable by the robot. A tool receiver 56, preferably mounted to float in all three spatial axes at storage location 2, has media connections 50 for air, rinsing agent and other operating media, query devices 52 for tool identification and an adjustable spring-loaded bolt 55. On insertion of the flange parts 7" into receiver 2, connection counterpieces arranged on the flange part 51, for example, air connections, which are closed in the uncoupled state, are connected to the media connections 50, for example, for air supply for a pneumatic lock. The connections 50 can also be used for grounding of the inserted atomizer. The query devices 52 of the storage locations 2 are brought into connection, during insertion of the atomizer, with the inserts 53 for type recognition, arranged replaceably in flange part 7". The flange part 7" also has a centering device 54 that engages in an adjustable spring-loaded bolt 55 during insertion of the flange part into the storage location 2. Interaction of the bolt 55 with the centering device 54 serves for position fixation of flange part 7" in the normal direction of mounting plate 10. The elements apparent at 58 are a device formed by ball-pressure pieces, for example, for centering of the storage fork in a prescribed position in a prism insert.

The change station described here can advantageously also serve as a fully automatic change device for fully automatic control and improvement of the coating quality during the painting operation, using appropriate quality measurement sensors, whose measurement results can be used for immediate, preferably also automatic, correction of the coating parameters in the same painting station. The same robot can be used here (especially in painting installations with relatively long cycle times) both for painting with optionally different application tools, such as air and rotary atomizers, and for directly connected result measurement and subsequent painting with possibly corrected process parameters (amount of paint, high voltage, air, speed, etc.).

For example, the following fully automatic operating process in a closed control loop can be obtained:

1. Coating of one or more workpieces.
2. Replacement of the atomizer used in step 1 with a sensor appropriate for measurement of a typical quality parameter, such as hue, color spreading and/or layer thickness, which is available in the change station just described.
3. Measurement of the coating quality with the painting robot.
4. Automatic classification (for example, according to DE 100 36 741) of coating errors recognized in step 3 and processing in a process computer and control system (for example, with fuzzy logic).
5. Replacement of the measurement sensor with an atomizer and final processing of the workpiece just coated and/or coating of the next workpieces with the process parameters calculated according to step 4.

FIGS. 3a through 3d show an alternative embodiment of the present invention. In FIG. 3a, a change station is shown for effecting an atomizer change of two robots with a turntable. The change station includes six storage locations and two rinsing and unloading stations. The change station includes a positioning station 100 and a removal station 102. The change station also includes a rinsing station 104 and a filling station 106. The positioning station 100 can receive an empty paint vessel. The empty atomizers can be stored with two robots. Two empty storage locations are available for this purpose. In FIG. 3b, the turntable or pivot unit is rotated and the refilled atomizers are taken up with two robots. In FIGS. 3c, the pivot unit is rotated and the atomizers just stored can be rinsed and filled. In FIG. 3d, the pivot unit can be rotated to bring empty storage locations into position for atomizer storage and removal.

Referring now to FIGS. 4a to 4d, another alternative embodiment of the present invention is illustrated. The invention provides a change station for atomizer change with a pivot unit. The change station includes a positioning and removal station 108 and a rinsing and filling station 110. An empty atomizer can be stored with a robot 5a. In FIG. 4b, the pivot unit can be rotated and the robot can take up a refilled atomizer. In FIG. 4c, the pivot unit can be rotated and a just-stored atomizer can be rinsed and filled. In FIG. 4d, the pivot unit can be rotated to bring an empty storage location into position for atomizer storage and removal.

Referring now to FIGS. 5a–5e, still another alternative embodiment of the present invention is illustrated. The invention provides an atomizer change with a pivot unit 117 rotatable around an axis A and a magazine 116. The magazine 116 can include four to ten storage locations for engaging the atomizers 7. In FIG. 5a, a robot 5b can store empty atomizers. The pivot unit 117 is shown including a storage and removal station 112 and a rinsing and filling station 114. The pivot unit 117 is disposed adjacent the magazine 116. In FIG. 5b, the pivot unit 117 can be rotated and the robot 5b can take up refilled atomizers 7. In FIG. 5c, the pivot unit 117 can be rotated in a direction Y relative to the axis A to store the rinsed and filled atomizers 7. As shown in FIG. 5d, the pivot unit 117 is reversibly rotated in the direction Y to the rotational direction X of the magazine 116 to replace and bring refilled atomizers 7 into the position of the empty magazine place. In FIG. 5e, the magazine 116 can be rotated to bring atomizers 7 into the removal position of the pivot unit 117. As a last step (not shown), the pivot unit 117 can be rotated so that the empty storage location is in position for atomizer storage by the robot 5b.

Referring now to FIG. 6, each atomizer, generally indicated at 7 includes a flange part 7''. The flange part 7'' includes air connection openings 118 and interchangeable inserts 120 for type detection. Each storage location 2 is defined in the periphery 10'' of the mount plate 10. Each storage location 2 can include a detect-type identifier 122, a tool storage member 124 floating in the XY direction, a spring loaded mechanism 126 for adjusting the tool storage mechanism 124, an atomizer connector 128, a port 130 for receiving an air supply, a ground connector 132, and a resilient, spherical pressure element 134 for centering the storage forks in the open position in a prism insert.

The invention claimed is:

1. A method for sequentially coating workpieces with tools releasably and exchangeably positioned in a plurality of storage locations, said method comprising the steps of:
    positioning a robotic device inside a cabin;
    placing a mounting unit defining a periphery adjacent the robotic device;
    forming the plurality of storage locations in the periphery to releasably engage the tools;
    rotating the mounting unit about an axis generally defined by the periphery to a position accessible by the robotic device to selectively engage a first of the tools for sequentially coating at least one of the workpieces; and
    moving a second of the tools to a second position to enable the robotic device to selectively engage the second tool once the robotic device completed sequentially coating at least one of the workpieces with the first tool as the first tool is returned to one of the storage locations.

2. The method as set forth in claim 1, including the step of positioning a magazine device rotatable relative the mounting unit and the robotic device.

3. The method as set forth in claim 2, including the step of rotating the mounting unit and the magazine device relative to one another to interchange at least one of the tools therebetween to place at least one the tools in the position accessible by the robotic device.

4. The method as set forth in claim 1, wherein the step of forming a plurality of storage locations in the periphery is further defined by forming an atomizer connector and a port for fluid supply.

5. The method as set forth in claim 4, wherein the step of forming a plurality of storage locations in the periphery is further defined by forming a tool engaging mechanism for engaging the tools.

6. The method as set forth in claim 4, including the step of providing a rinsing station and a filling station adjacent the robotic device to sequentially transfer the tools to the rinsing station and the filling station.

7. The method as set forth in claim 4, including the step of providing a measurement device in at least one of the storage locations.

8. The method as set forth in claim 7, including the step of measuring hue, spreading, layer thickness, and general quality parameters of the coat by the measurement device as the coat is applied to the workpiece.

9. The method as set forth in claim 8, including the step of modifying application procedures in response to at least one of hue, spreading, layer thickness, and general quality parameters determined by the measurement device.

10. A method for sequentially coating workpieces with tools releasably and exchangeably positioned in a plurality of storage locations, said method comprising the steps of:

positioning a robotic device inside a cabin;

installing a magazine defining a periphery to hold the tools;

placing a mounting unit defining a periphery adjacent the magazine and the robotic device;

forming the plurality of storage locations in the periphery of the mounting unit to releasably engage the tools;

rotating the mounting unit about a first axis generally defined by the periphery of the mounting unit to a position accessible by the robotic device to selectively engage a first of the tools to sequentially coat at least one of the workpieces and moving a second of the tools to a second position thereby enabling the robotic device to engage the second tool once the robotic device completed sequentially coating at least one of the workpieces with the first tool as the first tool is returned to one of the storage locations; and rotating the magazine about a second axis relative to the mounting unit to replace at least one of the first tool and the second tool engaged in the mounting unit with a third tool engaged in the magazine.

11. A method for sequentially coating workpieces with tools releasably and exchangeably positioned in a plurality of storage locations, said method comprising the steps of:

positioning a robotic device inside a cabin defining a wall;

placing a mounting unit defining a periphery for holding the tools adjacent the robotic device;

placing a cover over the mounting unit to protect the mounting unit holding the tools from soiling as the mounting unit rotates about an axis relative the cover; and moving the robotic device relative to the mounting unit between a first position as the robotic device opens the cover to remove a first tool from the mounting unit and a second position as the robotic device closes the cover after the first tool is replaced with a second tool removed from the mounting unit.

\* \* \* \* \*

UNITED STATES PATENT AND TRADEMARK OFFICE
CERTIFICATE OF CORRECTION

| | | |
|---|---|---|
| PATENT NO. | : 7,018,679 B2 | Page 1 of 1 |
| APPLICATION NO. | : 10/360774 | |
| DATED | : March 28, 2006 | |
| INVENTOR(S) | : Hans J. Nolte et al. | |

It is certified that error appears in the above-identified patent and that said Letters Patent is hereby corrected as shown below:

<u>Column 6,</u>
Line 47, insert -- of -- before "the tools.".

Signed and Sealed this

Twenty-seventh Day of June, 2006

JON W. DUDAS
*Director of the United States Patent and Trademark Office*